United States Patent [19]
Lundqvist

[11] 3,810,543
[45] May 14, 1974

[54] MOBILE PURIFYING PLANT FOR WASTE WATER

[75] Inventor: Bengt Olof Lundqvist, Gustavsberg, Sweden

[73] Assignee: AB Gustavsbergs Fabriker, Gustavsberg, Sweden

[22] Filed: Apr. 20, 1972

[21] Appl. No.: 245,778

[30] Foreign Application Priority Data
Apr. 29, 1971 Sweden.............................. 5616/71

[52] U.S. Cl................. 210/152, 210/199, 210/206, 210/252, 210/532 S
[51] Int. Cl............................................. C02c 1/02
[58] Field of Search ............ 210/44, 152, 241, 252, 210/261, 522, 532, 199, 206, 219

[56] References Cited
UNITED STATES PATENTS
| | | | |
|---|---|---|---|
| 3,482,694 | 12/1969 | Rice et al...................... | 210/522 X |
| 2,987,186 | 6/1961 | Burgoon et al. ................ | 210/532 X |
| 3,240,343 | 3/1966 | Werner........................... | 210/532 X |
| 3,466,241 | 9/1969 | Simpson......................... | 210/261 X |
| 3,677,940 | 7/1972 | Fujimoto et al. ..................... | 210/44 |
| 3,363,761 | 1/1968 | Groth et al. ...................... | 210/241 X |

FOREIGN PATENTS OR APPLICATIONS
300,952  9/1968  Sweden................................ 210/4

Primary Examiner—John Adee
Assistant Examiner—Robert H. Spitzer
Attorney, Agent, or Firm—Toren, McGeady & Stanger

[57] ABSTRACT

A purifying plant for waste water consists of a mobile housing of a size to be transported on public highways. The housing contains means for the biological purification of the waste water, means for mixing alumium suphate into the biologically purified water, a separator to separate the deposited particles from the water, and a tank to collect the particles separated in the separator. The various apparatuses are situated at one wall of the housing, so as to create a compact plant.

1 Claim, 2 Drawing Figures

MOBILE PURIFYING PLANT FOR WASTE WATER

The invention relates to a mobile purifying plant for waste water. The purifying plant is intended to receive waste water from a separator in which coarse particles have been removed by sedimentation. The purifying plant of the invention is of the type comprising means for biologically purifying water, a mixer for mixing a sedimentation agent such as aluminium sulphate into the biologically purified water, a separator to separate the deposited particles from the water, and a tank to collect the particles separated in the separator.

The main object of the invention is to provide a purifying plant for waste water to serve a small number of households, which is so compact that it can be moved on public highways on a trailer or on its own frame provided with wheels.

The water purifying plant according to the invention can be set up to service a small number of houses in a new residential area, for example. If the number of houses increases, two or more purifying plants can be connected in parallel. The purifying plant can alternatively be fitted as reserve in a permanent purifying plant while this is being repaired.

The purifying plant according to the invention is characterized in that the tank is mounted in the lower part of a mobile housing which preferably has heat-insulating walls, that the separator is united with the tank and positioned on the upper side of the tank, approximately midway between the ends of the tank, that means for biologically purifying the water are mounted above the tank on one side of the separator and that the mixer is mounted above the tank on the other side of the separator.

The separator should preferably be of the type usually referred to as a lamella separator. A separator of this type consists of a plurality of parallel plates or walls, positioned at an angle to the vertical. The water flows upwardly in the spaces between the plates. The precipitated particles flow downwards along the plates, and fall down into the tank.

The invention will be described in more detail in the following with reference to the drawing.

Figure 1:
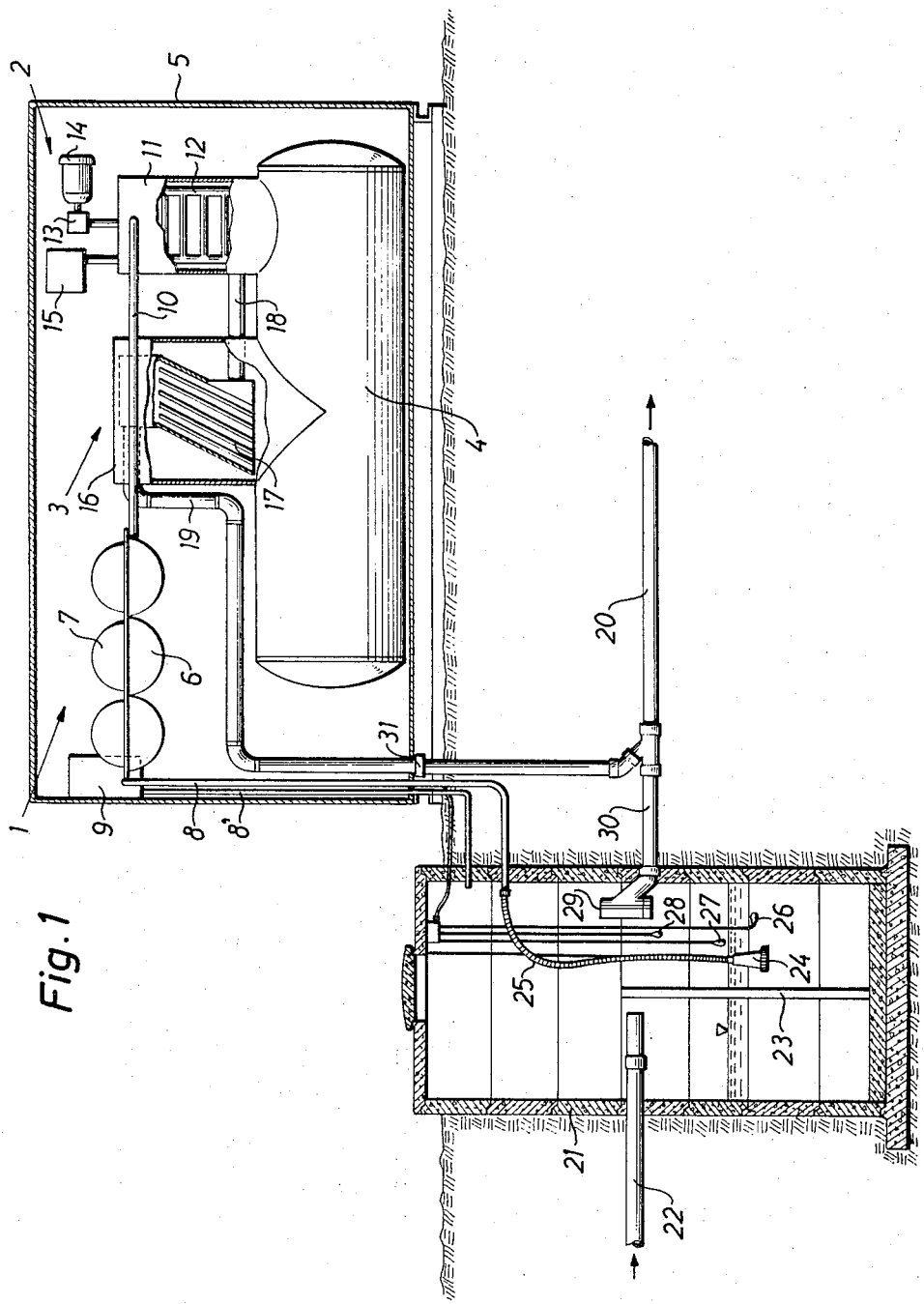
FIG. 1 shows a mobile purifying plant connected to a stationary sedimentation tank for coarse particles.
Figure 2:
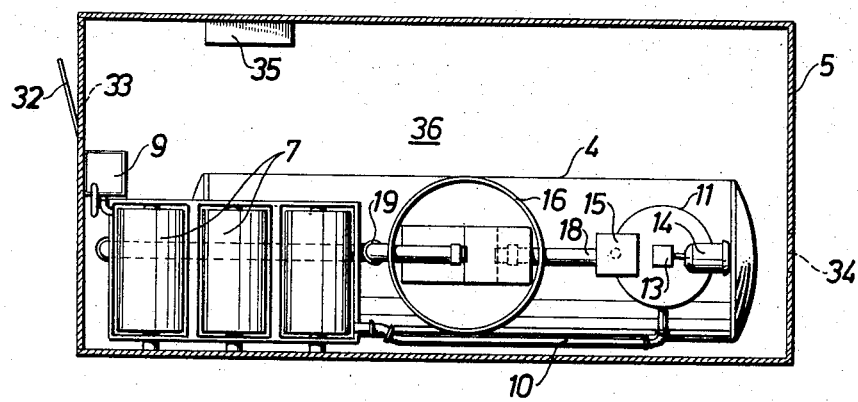
FIG. 2 shows a horizontal section through the plant of FIG. 1.

The purifying plant illustrated comprises four main units, i.e., a means 1 for biologically purifying the waste water, a mixer 2 for mixing a sedimentation agent into the biologically purified water, a separator 3 to separate the deposited particles from the water, and a tank 4 for collecting the particles separated in the separator. The separator 3 is united with the tank 4, and is situated approximately centrally on the upper side of the tank. The means 1 for biological purification and the mixer 2 are also mounted above the tank 4, one on each side of the separator 3. This positioning means that the four main units form a compact whole which is suitable for use as a mobile water purifying plant.

The purifying plant is mounted in a housing 5 having such a strong frame that it can be lifted on and off a trailer. The walls are preferably well heat-insulated and the housing may be provided with heating means. The housing is provided with ventilation openings 33, 34 so that the air necessary for the biological purification can enter. The main units of the purifying plant are arranged close to one long wall of the housing and the width of the housing is such that a passage 36 is formed along the other long wall, which can be reached through a door 32 for inspection and repair work. The housing also contains an electricity unit 35.

The main units of the purifying plant will now be described in more detail.

The means 1 for biological purification comprises three troughs 6 through which the water runs one by one. In each trough is a rotor 7 comprising a horizontal shaft with a number of discs. When the rotor is operated by a motor, not shown, the discs will be partly in the water and partly in the air, so that the water film on the discs is aerated. The water is supplied to the first trough from a cesspool, for example, through a pipe 8. Between the pipe 8 and the first trough is an equalizing container 9 containing members, for example a throttle flange or overflow, so that the first trough receives a steady supply of water. The excess water runs back to the cesspool through a conduit 8'.

The water runs from the last trough 6 through a conduit 10 to the mixer 2 which comprises a mixing vessel 11 with an agitator 12 which is driven by an electric motor 14 by way of a gear transmission 13. A sedimentation agent, for example a water solution of aluminium sulphate for precipitation of phosphate, is added from a dosing apparatus 15. The sedimentation agent is mixed with the water in the mixing vessel 11 and the sedimentation also starts to form here as flock.

The flocculation continues as the water flows on through a conduit 18 to the separator 3. This comprises an outer container 16 which is attached around an opening in the tank 4, and a unit 17 fitted in the container 16 and consisting of oblique plates or walls. The water enters at the bottom in the gaps between the plates and flows up in the gaps. The precipitated flock or particles thus become sedimented and when they reach the wall of the nearest plate, they slip down this plate due to the force of gravity and drop down into the tank 4 from the lower edge of the plate. The tank 4 is emptied when necessary, preferably with the help of a slurry exhauster.

The water which leaves the gaps between the plates at the top has thus been substantially freed from precipitated particles. The water now flows from the separator through a pipe 19 to a pipe 20 laid in the ground leading to a recipient.

FIG. 1 also shows how a purifying plant according to the invention can be connected to a permanent cesspool 21 which receives waste water from a conduit 22. The cesspool is divided by partition walls 23 into three chambers, the coarser impurities settling at the bottom of these chambers. In the last chamber an immersible pump 24 is arranged which pumps water through a tube 25 and the pipe 8 to the biological purifying plant 1. The electric motor for the pump 24 is controlled by level sensers 26, 27 which sense the lowest and highest desired levels in the cesspool. A third level senser 28 is arranged to start an alarm device if the level rises higher. If the level rises even higher, the water will run over an overflow 29 and flow through a conduit 30 directly to the pipe 20 which connects the purifying plant to the recipient.

The connection and disconnection of the purifying plant is facilitated if the pipes which connect the mobile purifying plant to the permanent cesspool and to the recipient are provided with pipe-joints or connections 31 in the bottom frame of the housing 5. An electric cable should accompany the purifying plant so that the electricity unit 35 in the housing 5 can be connected to the electricity mains.

In the purifying plant according to the invention it is advantageous if the various units are placed, as shown in the drawing, so that the water is pumped up to a highest level at the inlet to the biological purifying plant and then flows through the biological purifying plant, the mixer and the separator to the recipient by force of gravity.

What is claimed is:

1. A mobile plant for the purification of waste water, comprising a heat insulated housing arranged to be mounted on a trailer, said housing being elongated in at least the horizontal direction with a pair of spaced parallel walls forming the opposite sides of the housing in the elongated direction, said housing arranged to be transported on public highways, an elongated tank located within said housing in the lower portion thereof and having its elongated direction positioned horizontally and extending in the elongated direction of said parallel walls of said housing, separating means in communication with said tank and located above and approximately centrally of the elongated direction of said tank, means for biological purification of the waste water located within said housing above and on one side of said separator in the elongated direction of said tank, means for admixing a sedimentation agent into the biologically purified water located within said housing above said tank and on the opposite side of said separator in the elongated direction of said tank from said means for biological purification, said means for the biological purification of the waste water comprising a plurality of troughs disposed in side-by-side relationship with a first one of said troughs located adjacent one end of said housing extending transversely of the elongated direction of the parallel walls of said housing, a rotor positioned in each of said troughs, each said rotor comprising a shaft and a plurality of discs mounted on said shaft for rotation therewith, said discs arranged in said troughs so that with water filling said troughs a portion of each said disc is located below the water and the remaining portion is located above the water, said admixing means are located adjacent the opposite end of said housing from the end at which said means for the biological purification of the waste water is located, said parallel walls of said housing spaced sufficiently apart to afford a passageway through said housing along the elongated direction of said tank for performing inspection and repair work within said housing, said housing having a door therein affording access to the passageway and said housing having ventilation openings for admitting air into said housing for the operation of the biological purification means.

* * * * *